US005676222A

United States Patent [19]

Wu

[11] Patent Number: 5,676,222

[45] Date of Patent: Oct. 14, 1997

[54] DEVICE FOR GENERATING A ROTARY RETURN FORCE

[76] Inventor: Chia-Tien Wu, No. 47, Kang-Le St., Taichung City, Taiwan

[21] Appl. No.: 540,493

[22] Filed: Oct. 10, 1995

[51] Int. Cl.[6] .................................. F03G 1/00; E05F 1/08

[52] U.S. Cl. ..................................... 185/39; 16/64; 16/79; 16/DIG. 10; 49/386

[58] Field of Search ................................. 185/39; 49/386; 16/64, 79, DIG. 10

[56] References Cited

U.S. PATENT DOCUMENTS

| | | | |
|---|---|---|---|
| 14,583 | 4/1856 | Barton | 16/79 |
| 2,460,270 | 2/1949 | Ashley et al. | 185/39 X |
| 3,699,608 | 10/1972 | Schwarz | 16/79 |
| 4,463,831 | 8/1984 | Wakase | 185/39 |
| 4,912,806 | 4/1990 | Orii et al. | 16/64 |

*Primary Examiner*—Richard M. Lorence
*Attorney, Agent, or Firm*—Bacon & Thomas

[57] ABSTRACT

A device for generating a rotary return force includes a casing unit, driving and driven gear units disposed in the casing unit, and a torsion spring. The driving gear unit includes a driving axle mounted rotatably to the casing unit and a driving gear wheel mounted fixedly on the driving axle. The driving axle is adapted to be driven rotatably by a rotatable unit. The driven gear unit includes a driven axle mounted rotatably to the casing unit and a driven gear wheel mounted on the driven axle. The driven gear wheel meshes with the driving gear wheel. One of the driven and driving gear wheels is larger than the other one of the driven and driving gear wheels. The torsion spring has a first retaining end secured to the driven gear unit and a second retaining end secured to the casing unit. Rotation of the driving gear wheel in a first direction by the rotatable unit causes corresponding rotation of the driven gear wheel and winding of the torsion spring. Removal of a rotary force applied by the rotatable unit on the driving gear wheel causes the torsion spring to unwind and to drive rotatably the driven gear wheel and the driving gear unit in order to generate the rotary return force for rotating the rotatable unit in a second direction opposite to the first direction.

5 Claims, 3 Drawing Sheets

DEVICE FOR GENERATING A ROTARY RETURN FORCE

BACKGROUND OF THE INVENTION

1. Field of the Invention

The invention relates to a return force generating device, more particularly to a device for generating a rotary return force.

2. Description of the Related Art

Fluid-based devices for generating a rotary return force are known in the art. Such devices are complicated in construction and are expensive to manufacture. In addition, conventional rotary return force generating devices which use hydraulic fluid suffer from an additional drawback in that they are prone to leakage, thereby resulting in pollution.

SUMMARY OF THE INVENTION

Therefore, the object of the present invention is to provide a rotary return force generating device which is simple in construction and which does not have the aforementioned drawbacks of the conventional fluid-based rotary return force generating devices.

Accordingly, the device of the present invention is used in the generation of a rotary return force and comprises a casing unit, driving and driven gear units disposed in the casing unit, and a torsion spring. The driving gear unit includes a driving axle mounted rotatably to the casing unit and a driving gear wheel mounted fixedly on the driving axle. The driving axle is adapted to be driven rotatably by a rotatable unit. The driven gear unit includes a driven axle mounted rotatably to the casing unit and a driven gear wheel mounted on the driven axle. The driven gear wheel meshes with the driving gear wheel. One of the driven and driving gear wheels is larger than the other one of the driven and driving gear wheels. The torsion spring has a first retaining end secured to the driven gear unit and a second retaining end secured to the casing unit. Rotation of the driving gear wheel in a first direction by the rotatable unit causes corresponding rotation of the driven gear wheel and winding of the torsion spring. Removal of a rotary force applied by the rotatable unit on the driving gear wheel causes the torsion spring to unwind and to drive rotatably the driven gear wheel and the driving gear unit in order to generate the rotary return force for rotating the rotatable unit in a second direction opposite to the first direction.

BRIEF DESCRIPTION OF THE DRAWINGS

Other features and advantages of the present invention will become apparent in the following detailed description of the preferred embodiments, with reference to the accompanying drawings, of which.

DETAILED DESCRIPTION OF THE PREFERRED EMBODIMENTS

Figure 1:
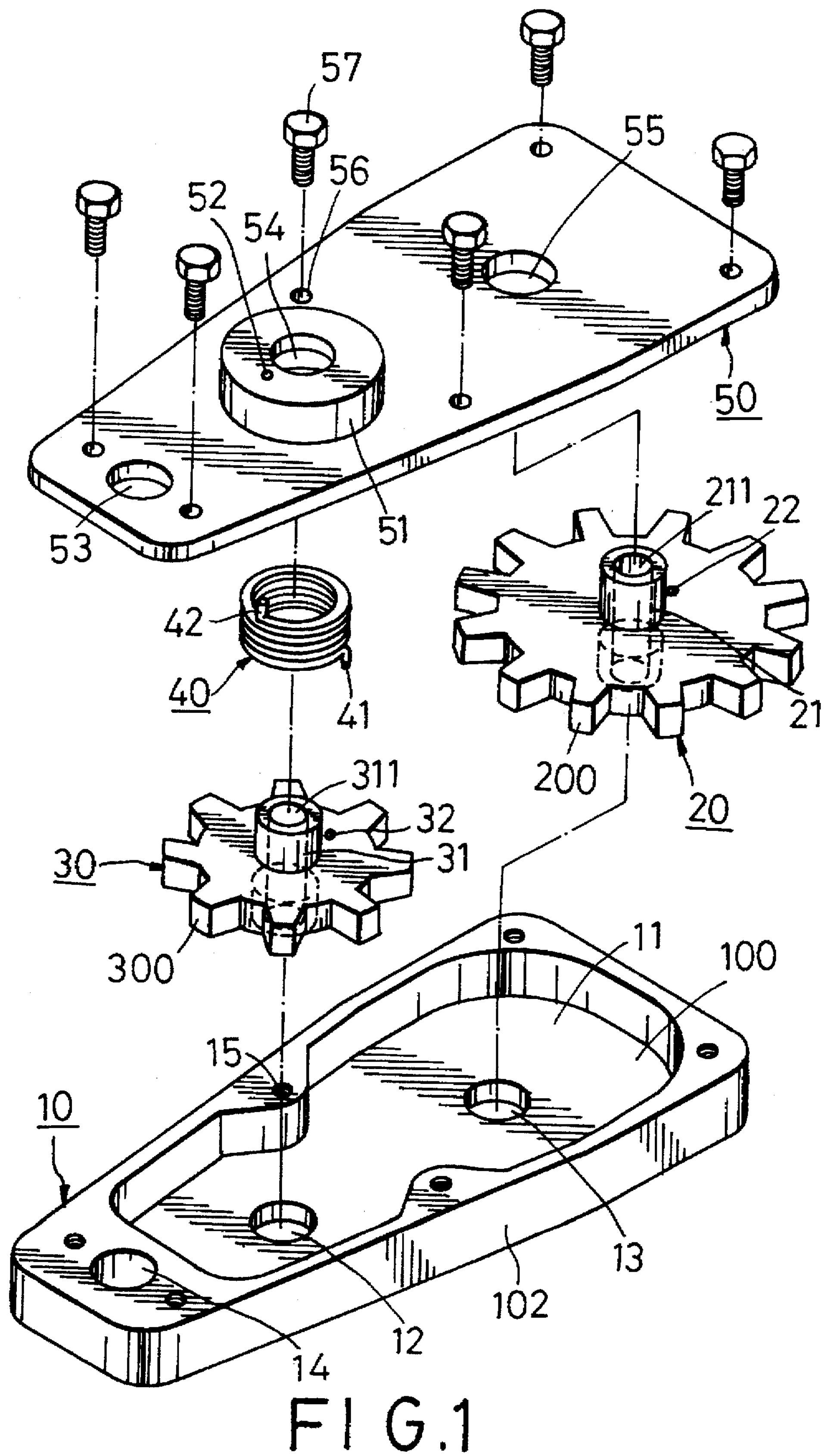
FIG. 1 is an exploded view of the first preferred embodiment of a rotary return force generating device according to the present invention.

Referring to FIG. 1, the first preferred embodiment of a rotary return force generating device according to the present invention is shown to comprise a casing unit which includes a casing body 10 and a top cover 50, a driving gear unit 20, a driven gear unit 30, and a torsion spring 40.

The casing body 10 is a generally rectangular case which confines a receiving space 11. The casing body 10 includes a bottom wall 100 formed with first and second shaft holes 12, 13 and a peripheral surrounding wall 102 that extends upwardly from the bottom wall 100. The surrounding wall 102 has a top face formed with a mounting hole 14 that extends through the bottom wall 100, and six threaded holes 15.

The driving gear unit 20 includes a driving axle 21 and a driving gear wheel 200 mounted fixedly on the driving axle 21, such as by welding. The driving axle 21 is formed with an axial through-hole 211. The driving gear wheel 200 is formed with an eccentric retaining hole 22.

The driven gear unit 30 includes a driven axle 31 and a driven gear wheel 300 mounted on the driven axle 31. The driven gear wheel 300 may be mounted fixedly or rotatably on the driven axle 31. In this embodiment, the driven gear wheel 300 is formed integrally with the driven axle 31 and is smaller than the driving gear wheel 200. The driven axle 31 is formed with an axial through-hole 311. The driven gear wheel 300 is formed with an eccentric retaining hole 32.

The torsion spring 40 is a coil spring with first and second retaining ends 41, 42.

The top cover 50 is formed as a plate member with a hollow cylindrical projection 51 protruding upwardly therefrom. The top cover 50 has a first shaft hole 54 formed on a top end of the cylindrical projection 51, a second shaft hole 55, a mounting hole 53 and six screw holes 56. The top end of the cylindrical projection 51 is further formed with an eccentric retaining hole 52.

Figure 2:
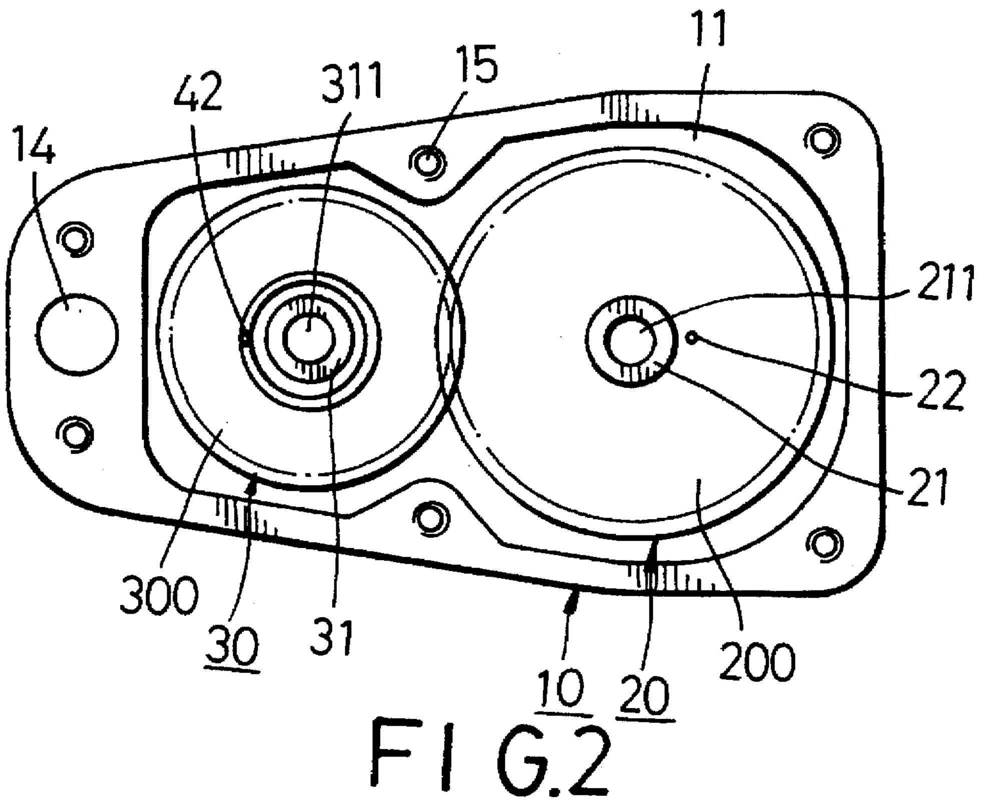
FIG. 2 is a top view of the first preferred embodiment without the top cover.
Figure 3:
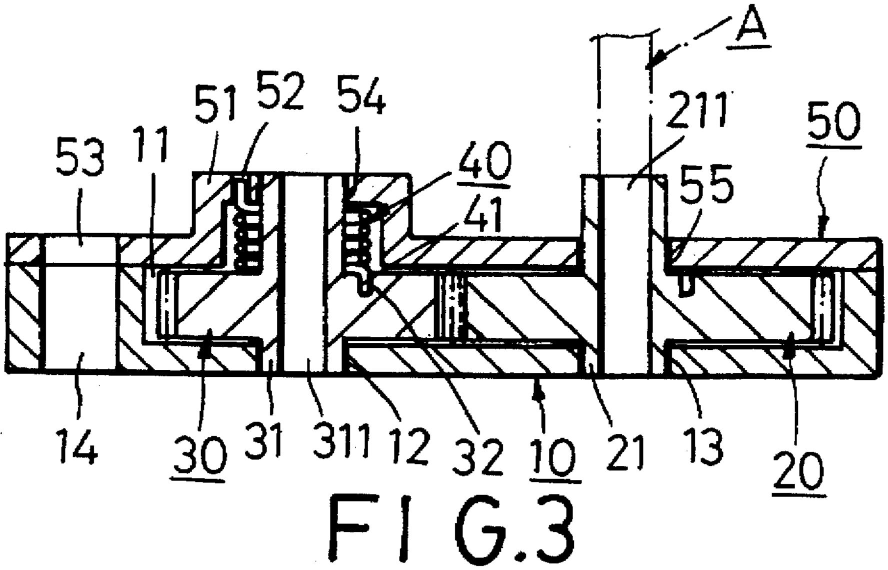
FIG. 3 is a sectional view of the first preferred embodiment.

Referring to FIGS. 2 and 3, the driving and driven gear units 20, 30 are mounted rotatably in the casing body 10 such that the lower ends of the driven and driving axles 31, 21 extend rotatably and respectively into the first and second shaft holes 12, 13 in the casing body 10, and such that the driving gear wheel 200 and the driven gear wheel 300 mesh with one another. The torsion spring 40 is sleeved on the upper end of the driven axle 31, and the first retaining end 41 of the torsion spring 40 extends into the retaining hole 32 in the driven gear wheel 300. The upper end of the driven axle 31 extends rotatably into the first shaft hole 54 of the top cover 50, and the second retaining end 42 of the torsion spring 40 extends into the retaining hole 52 of the cylindrical projection 51 on the top cover 50. The upper end of the driving axle 21 extends rotatably into the second shaft hole 55 of the top cover 50. The screw holes 56 in the top cover 50 are aligned with the threaded holes 15 in the casing body 10, and screws 57 (see FIG. 1) extend through the screw holes 56 and engage threadedly the threaded holes 15 to secure the top cover 50 on the casing body 10. The mounting hole 53 is aligned with the mounting hole 14 to permit mounting of the top cover 50 and the casing body 10 on a frame (not shown). Alternatively, the first preferred embodiment may be mounted on the frame via the through-hole 311 in the driven axle 31 of the driven gear unit 30.

In operation, the driving axle 21 is adapted to be connected to a rotatable shaft (A) via the through-hole 211. When the rotatable shaft (A) rotates in a first direction, the driving axle 21 rotates therewith, thereby driving the driving gear wheel 200 to rotate in the first direction and cause the driven gear wheel 300 to rotate in a second direction opposite to the first direction. The torsion spring 40 is wound at this time to cushion rotation of the rotatable shaft (A).

When the force transmitted by the rotatable shaft (A) to the driving axle 21 is extinguished, the torsion spring 40 unwinds to rotate the driven gear wheel 300 in the first direction. The driving gear wheel 200 rotates in the second direction at a slower speed compared to the driven gear wheel 300, thereby resulting in the application of a slow rotary return force on the rotatable shaft (A). The first preferred embodiment is thus ideal for use in door closure mechanisms and the like.

Figure 4:
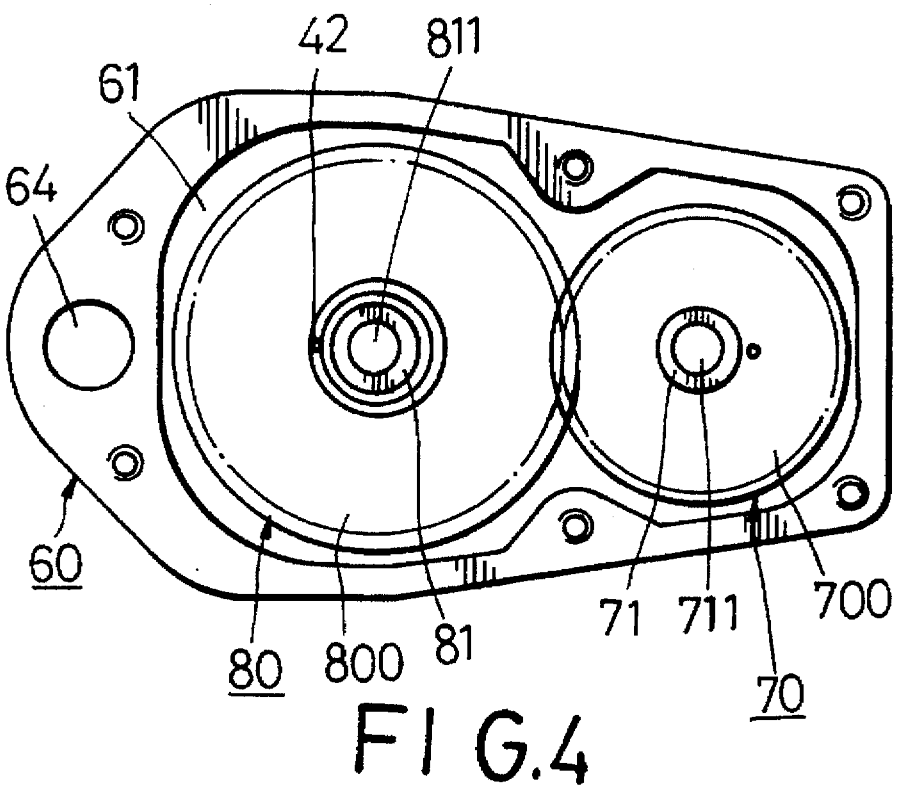
FIG. 4 is a top view of the second preferred embodiment of a rotary return force generating device according to the present invention, the top cover thereof being removed.
Figure 5:
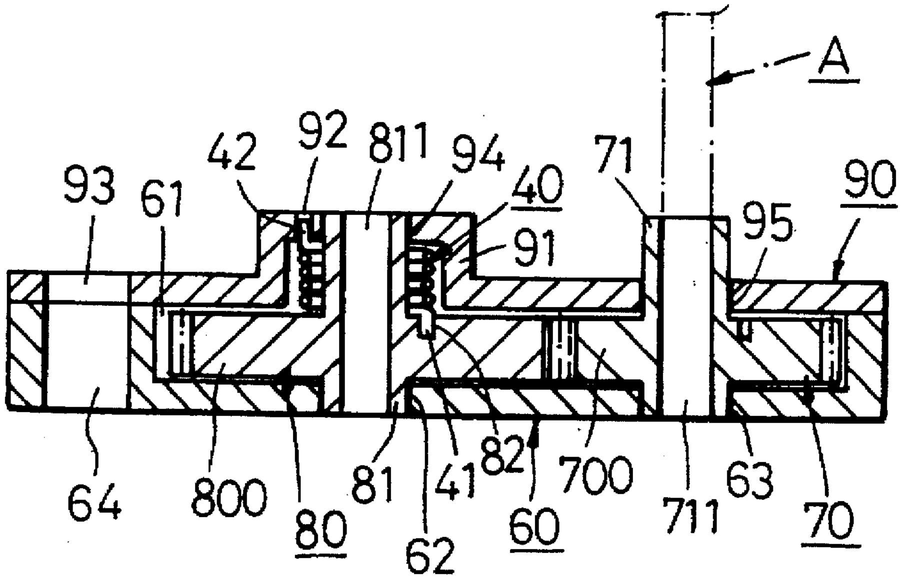
FIG. 5 is a sectional view of the second preferred embodiment.

FIGS. 4 and 5 illustrate the second preferred embodiment of a rotary return force generating device according to the present invention. As shown, the second preferred embodiment similarly comprises a casing unit which includes a casing body 60 and a top cover 90 mounted on top of the casing body 60, driving and driven gear units 70, 80 mounted rotatably in the receiving space 61 of the casing body 60, and a torsion spring 40. The top cover 90 is formed as a plate member with a hollow cylindrical projection 91 protruding upwardly therefrom. The driving gear unit 70 includes a driving axle 71 and a driving gear wheel 700 mounted fixedly on the driving axle 71. The driven gear unit 80 includes a driven axle 81 and a driven gear wheel 800 mounted on the driven axle 81. In this embodiment, the driven gear wheel 800 is formed integrally with the driven axle 81, although the driven gear wheel 800 may be mounted rotatably on the driven axle 81. The driven gear wheel 800 is larger than the driving gear wheel 700. The torsion spring 40 is sleeved on the upper end of the driven axle 81, and the first retaining end 41 of the torsion spring 40 extends into an eccentric retaining hole 82 formed in the driven gear wheel 800, while the second retaining end 42 of the torsion spring 40 extends into the eccentric retaining hole 92 formed in the top end of the cylindrical projection 91 on the top cover 90. The lower ends of the driving and driven axles 71, 81 are mounted rotatably and respectively in shaft holes 63, 62 formed in the casing body 60, while the upper ends of the driving and driven axles 71, 81 are mounted rotatably and respectively in shaft holes 95, 94 formed in the top cover 90. The driving and driven gear wheels 700, 800 mesh with one another. As with the previous embodiments, the top cover 90 and the casing body 60 are formed with aligned mounting holes 93, 64 to permit mounting of the second preferred embodiment on a frame (not shown). Alternatively, the second preferred embodiment may be mounted on the frame via an axial through-hole 811 formed in the driven axle 81 of the driven gear unit 80.

In Operation, the driving axle 71 is adapted to be connected to a rotatable shaft (A) via an axial through-hole 711 formed in the former. When the rotatable shaft (A) rotates in a first direction, the driving axle 71 rotates therewith, thereby driving the driving gear wheel 700 to rotate in the first direction and cause the driven gear wheel 800 to rotate in a second direction opposite to the first direction. The torsion spring 40 is wound at this time to cushion rotation of the rotatable shaft (A). When the force transmitted by the rotatable shaft (A) to the driving axle 71 is extinguished, the torsion spring 40 unwinds to rotate the driven gear wheel 800 in the first direction. The driving gear wheel 700 rotates in the second direction at a faster speed compared to the driven gear wheel 800, thereby resulting in the application of a fast rotary return force on the rotatable shaft (A). The second preferred embodiment is thus ideal for use in industrial applications which require a rapid reaction.

It has thus been shown that the device of this invention is simple in construction, does not easily break down, and can be manufactured in a fully automated manner at a relatively low cost. In addition, the different embodiments of the device of this invention permits the use of the same in applications which require a retarded reaction or a rapid reaction.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A device for generating a rotary return force, comprising:

a casing unit;

a driving gear unit disposed in said casing unit and including a driving axle mounted rotatably to said casing unit and a driving gear wheel mounted fixedly on said driving axle, said driving axle having an axial through hole configured to engage a rotatable shaft so as to rotate said driving gear unit;

a driven gear unit disposed in said casing unit and including a driven axle mounted rotatably to said easing unit and a driven gear wheel mounted on said driven axle, said driven gear wheel meshing with said driving gear wheel throughout its range of movement, one of said driven and driving gear wheels being larger than the other one of said driven and driving gear wheels; and a torsion coil spring having a first retaining end secured to said driven gear unit and a second retaining end secured to said casing unit;

whereby, rotation of said driving gear wheel in a first direction by the rotatable shaft causing corresponding rotation of said driven gear wheel and winding of said torsion spring, removal of rotary force applied by the rotatable shaft on said driving gear wheel causing said torsion spring to unwind and to rotatably drive said driven gear wheel and said driving gear unit in order to generate the rotary return force opposite to said first direction.

2. The device for generating a rotary return force as claimed in claim 1, wherein said casing unit comprises a casing body with a bottom wall and a peripheral surrounding wall which extends upwardly from said bottom wall, and a top cover mounted on said surrounding wall.

3. The device for generating a rotary return force as claimed in claim 2, wherein each of said driving and driven axles has a first end mounted rotatably on said bottom wall of said casing body, and a second end mounted rotatably to said top cover.

4. The device for generating a rotary return force as claimed in claim 3, wherein said top cover is formed with a protruding hollow cylindrical projection, said second end of said driven axle extending into and being mounted rotatably to said cylindrical projection.

5. The device for generating a rotary return force as claimed in claim 4, wherein said torsion coil spring is sleeved on said second end of said driven axle, said first retaining end of said torsion coil spring being secured to said driven gear wheel, said second retaining end of said torsion cot spring being secured to said cylindrical projection.

* * * * *